Figure 3:
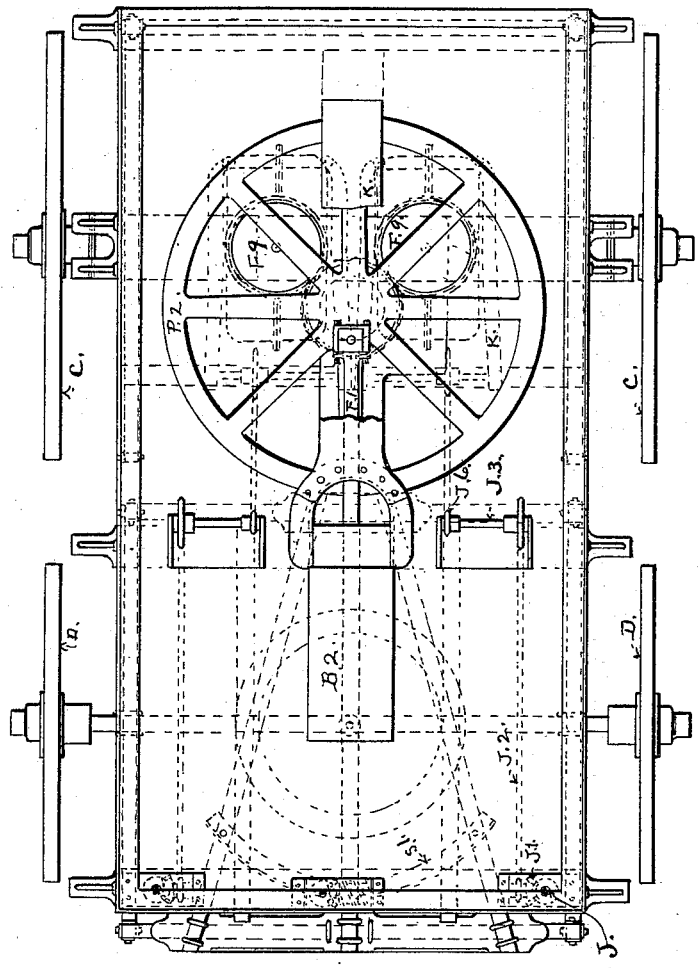

No. 637,750. Patented Nov. 21, 1899.
J. W. OGDEN.
MOTOR VEHICLE.
(Application filed Nov. 4, 1898.)
(No Model.) 4 Sheets—Sheet 1.
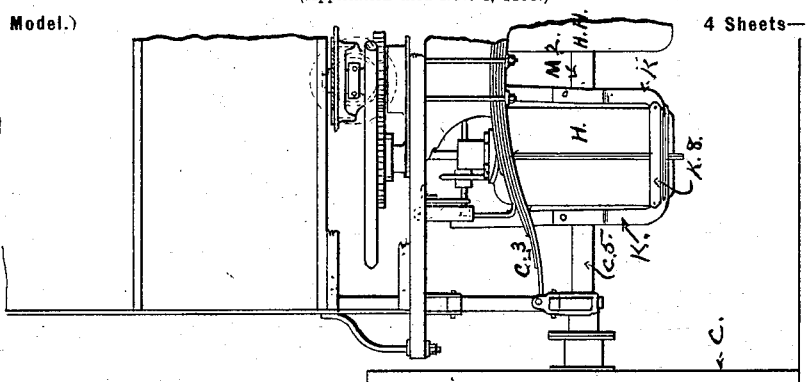
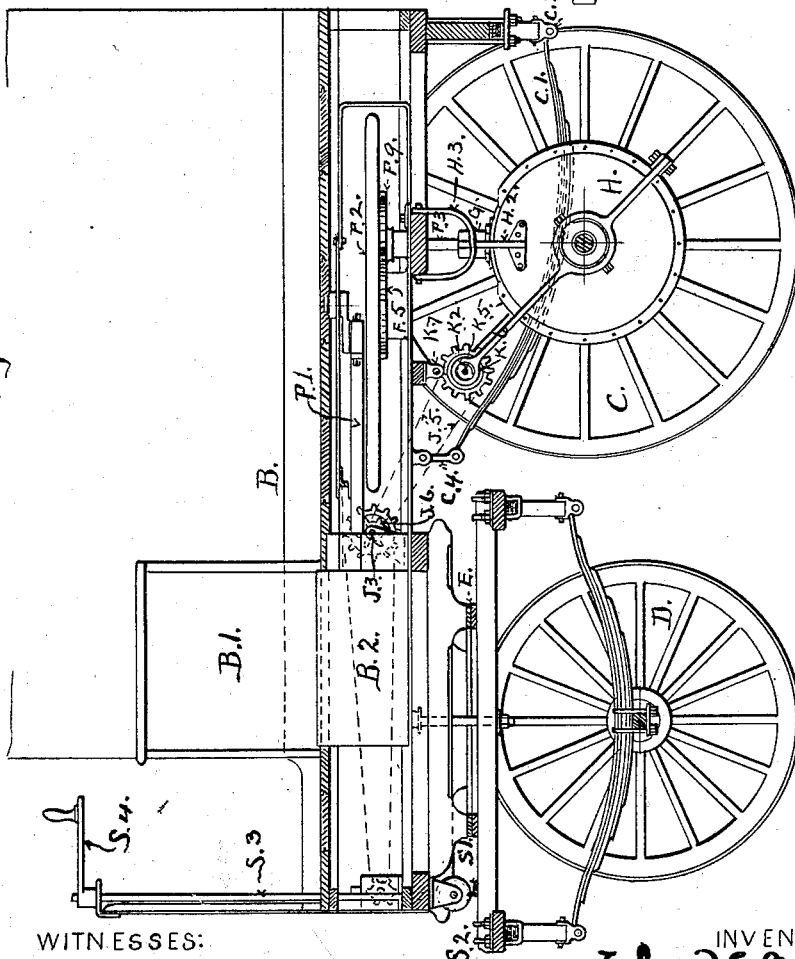
WITNESSES:
INVENTOR
John W. Ogden
BY
ATTORNEY.

No. 637,750. Patented Nov. 21, 1899.
J. W. OGDEN.
MOTOR VEHICLE.
(Application filed Nov. 4, 1898.)

(No Model.) 4 Sheets—Sheet 2.

WITNESSES:

INVENTOR
John W. Ogden
BY
ATTORNEY.

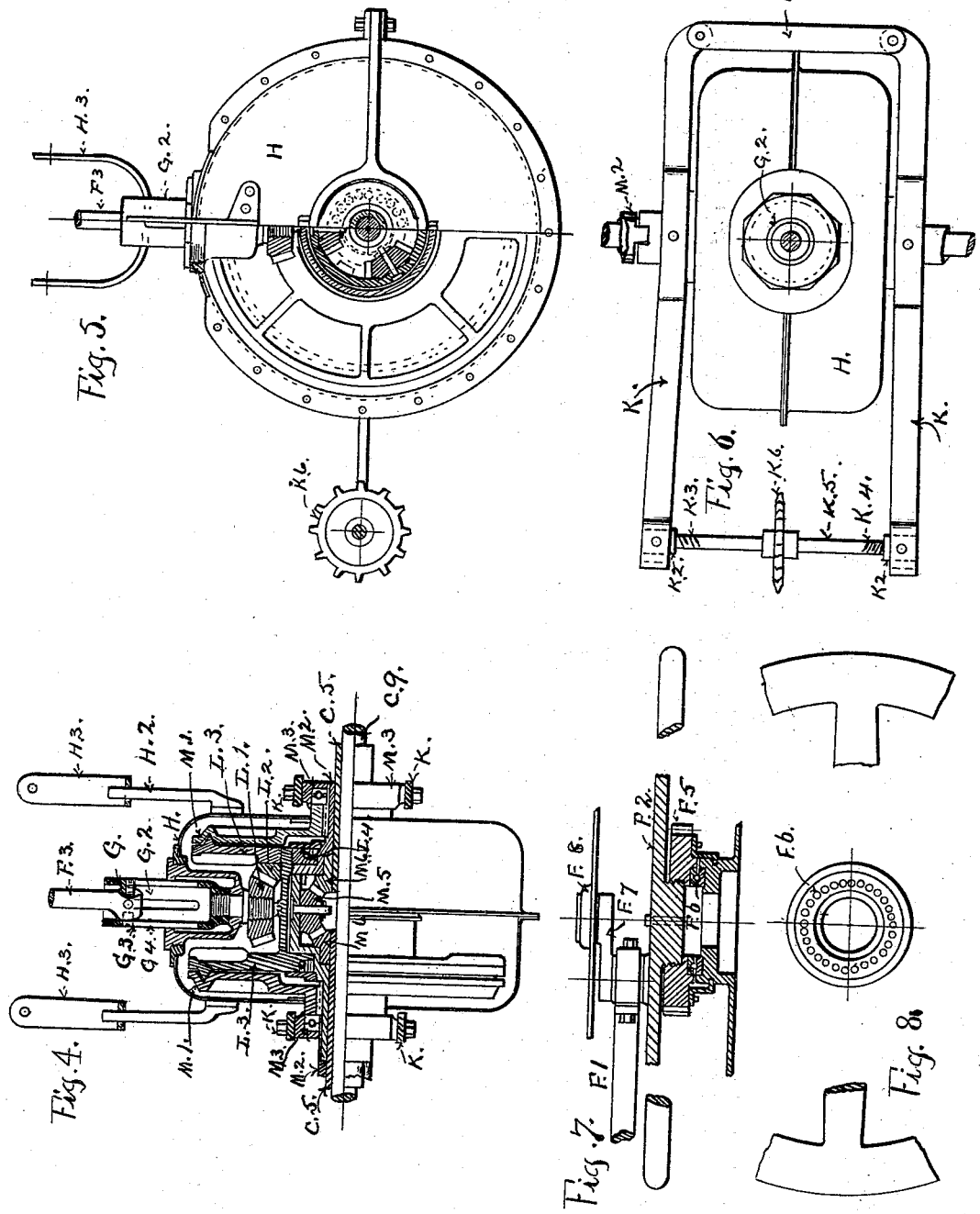

No. 637,750. Patented Nov. 21, 1899.
J. W. OGDEN.
MOTOR VEHICLE.
(Application filed Nov. 4, 1898.)
(No Model.) 4 Sheets—Sheet 4.
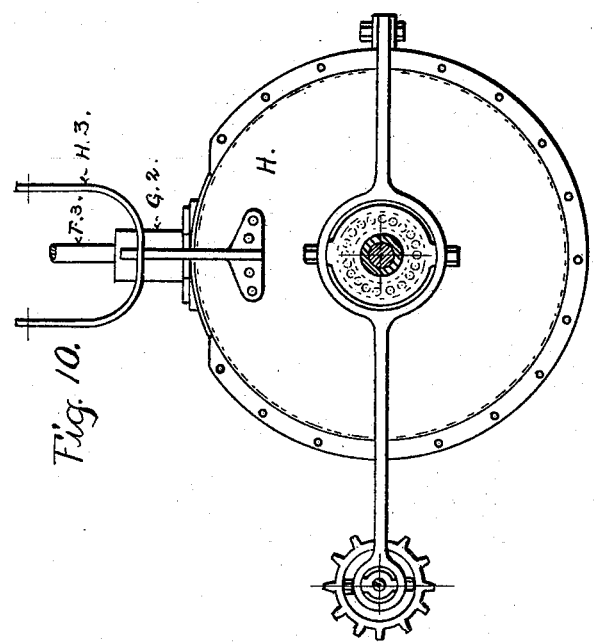
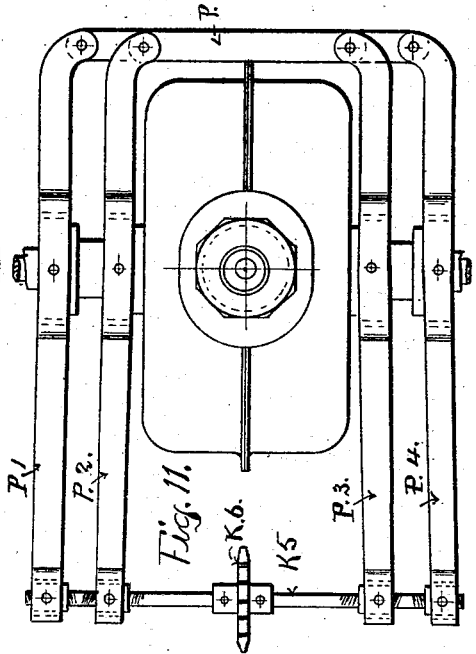
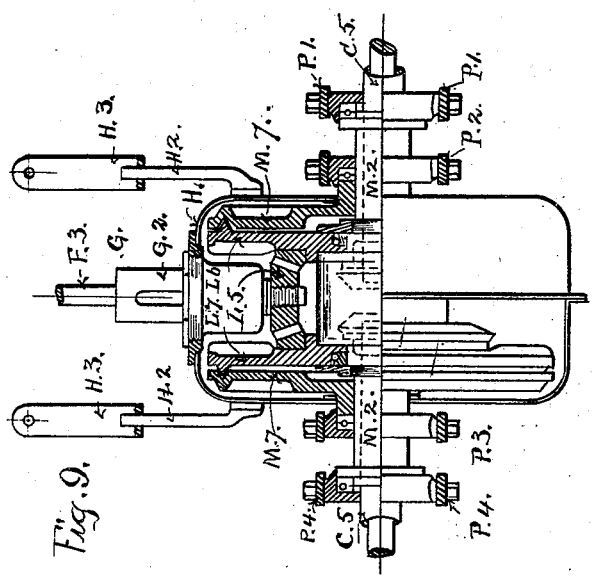
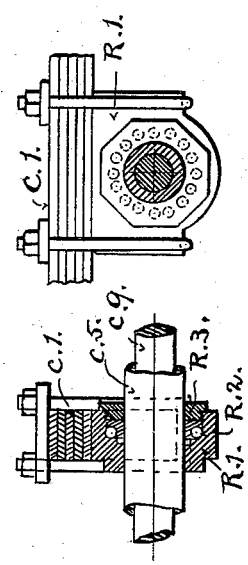
WITNESSES:
INVENTOR
John W. Ogden
BY
ATTORNEY.

UNITED STATES PATENT OFFICE.

JOHN W. OGDEN, OF PLAINFIELD, NEW JERSEY.

MOTOR-VEHICLE.

SPECIFICATION forming part of Letters Patent No. 637,750, dated November 21, 1899.

Application filed November 4, 1898. Serial No. 695,523. (No model.)

*To all whom it may concern:*

Be it known that I, JOHN W. OGDEN, residing at Plainfield, in the State of New Jersey, have invented certain new and useful Improvements in Motor-Vehicles, of which the following is a description, referring to the accompanying drawings, which form part of this specification.

In certain aspects of the invention it is not material what type of prime motor or mechanical power is employed, although the invention is particularly intended for that class of motors in which power is derived from the combustion and expansion of hydrocarbon oils with air. The improvements that constitute the present invention concern principally the connections or the means for transmitting power from the motor to the driving-wheels of the vehicle. These means will be best understood by the example of them shown in the accompanying drawings, and I will then point out more generally in the claims the novel features which characterize my invention and distinguish it from the prior art.

Figure 1 is a side view, partly in section, showing my improvements as applied to an express or delivery wagon. Fig. 2 is a partial end view showing some of the parts in section. Fig. 3 is a plan view by which the general arrangement and assembling of the several elements are clearly shown. Figs. 4, 5, and 6 are detail views, partly in section, showing a portion of the driving mechanism, with the friction clutches and equalizing mechanism for driving two wheels. Fig. 7 is an enlarged detail view, in vertical section, of a portion of the fly-wheel and crank. Fig. 8 is a detail plan view of the ball-bearings for the fly-wheel. Figs. 9, 10, and 11 show a modification in which a single driving mechanism and set of clutches are employed for driving the vehicle forward or backward at will instead of employing two driving connections or clutches, as shown in the preceding figures; and Figs. 12 and 12$^A$ show a section and end view of the ball-bearings for the wheel-axles.

Throughout the drawings like reference letters and numerals refer to like parts, the numerals being affixed to the reference-letters to indicate different parts of a given mechanism or element.

The body of the wagon is indicated by the letter B. The driving-wheels C, front wheels D, and fifth-wheel E may be of any approved construction. I prefer to mount the hind wheels upon the springs C′, pivoted at C$^2$ to the transverse springs C$^3$ and at the front ends to the short link C$^4$. By such means the motion of the rear wheels relatively to the wagon-body is guided in a very nearly vertical line, which facilitates the driving connections, as will presently be understood.

The motor is preferably located beneath the driver's seat B′ in the casing B$^2$, and its pitman F′ actuates the crank of the horizontally-revolving fly-wheel F$^2$. The fly-wheel directly or indirectly actuates one or more vertical shafts F$^3$, which project beneath the body of the wagon and are connected by telescopic and somewhat flexible joints G with a set of clutches and actuating connections for the wheel-shafts C$^5$, all the parts beneath the flexible and telescopic joint G being supported and centered upon the wheel-shafts.

H shows the casings for inclosing the running parts in a neat but substantial manner.

In Figs. 1 to 8, inclusive, two distinct sets of connections included within casings H and for different speeds, if desired, are shown, and two distinct connections from the forward end of the vehicle are provided for controlling the application of power to the hind wheels to drive the vehicle forward or backward. When the mechanism shown in Figs. 9, 10, and 11 is employed, only one such connection from the forward end of the vehicle is necessary. These controlling connections are as follows: At the forward end of the vehicle, in a convenient position for the driver, is a vertical shaft J, (see Fig. 3,) which by means of beveled gears J′ and sprocket-chain connections J$^2$ turns the shaft J$^3$, mounted in the wagon-body. A pair of clutch-levers K, which control the application of power in a manner presently described, carry at their upper ends suitably-pivoted screw-threaded bushings or sleeves K$^2$, which are threaded onto right and left screw-threaded portions K$^3$ K$^4$ of a shaft K$^5$, which carries a sprocket-wheel K$^6$. This shaft K$^5$ is hung by short links from a bracket K$^7$ beneath the wagon-body, as seen clearly in Fig. 1. A sprocket-chain J$^5$ connects the sprocket-wheel K$^6$ with the sprocket J$^6$ on the shaft J$^3$. By these means the rise and fall of the wheel-shafts relatively to the wagon-body carry the levers K up and down only, producing a slight displacement of the shaft $K^5$, which is so slight, however, as to interfere in no way with the operation of the sprocket-chain $J^5$. The lower ends of the levers K are connected or fulcrumed to a loose link $K^8$, so that the rotation of the shaft $K^5$ in one direction or the other forces the levers K toward or away from each other, connecting or disconnecting the friction-clutches, as will be presently explained.

I will now describe the driving mechanism more in detail.

Secured to the fly-wheel $F^2$ and preferably close beneath it is a gear-wheel $F^5$. Both these parts are supported and turn upon the ball-bearings $F^6$. The crank $F^7$ and wrist-pin to which the pitman $F'$ is connected may also be centered and supported above by means of the bearing $F^8$ in the upper frame of the motor or engine. It will be seen by this construction that the fly-wheel has no shaft and runs with a minimum of friction, for it is intended that the motor shall run continuously and the vehicle be controlled by connecting and disconnecting friction-clutches for starting and propelling the vehicle. Only during a long stop is it intended that the motor shall be shut down. The gear-wheel $F^5$ meshes with and actuates the two gear-wheels $F^9$, which are secured to and turn the shafts $F^3$ and are supported to turn upon suitable bearings. In Figs. 1 to 8 two of these gear-wheels and two of these shafts $F^3$ are required. With the construction shown in Figs. 9, 10, and 11 only one such shaft is required. Where two shafts are used, each serves, exclusively, to propel the vehicle in a single direction, whether forward or backward, through the driving connections shown in Figs. 4, 5, and 6. The shaft $F^3$ is connected with a second shaft $G^2$ by a flexible telescopic joint G, already mentioned. One of the members of this joint—such, for instance, as the shaft $F^3$—is provided with a rounded head and a number of studs $G^3$, which fit into the slots $G^4$ in the sleeve or tubular shaft $G^2$. By this means the shaft $G^2$ may move up and down relatively to the shaft $F^3$ and may also be swung angularly to a considerable extent without disturbing the transmission of power. In other words, I provide a combined universal and telescopic joint at this point. The shaft $G^2$ is fixed to turn in the casing H and carries at its lower end a bevel-gear $L'$, which meshes with the gear $L^2$, secured to one double-clutch member $L^3$, mounted to turn freely upon the ball-bearings $L^4$. The shaft $G^2$ therefore transmits rotation to the double-clutch member $L^3$. The opposing members $M'$ of the double clutch are feathered onto a sleeve $M^2$ and are provided with collars $M^3$, which do not turn with the clutches, but are pivoted to the clutch-levers K. Ball-bearings $M^4$ are interposed between these collars $M^3$ and the clutch members $M'$ to take the end thrust, because when the levers K are drawn together, forcing the clutch members $M'$ against the revolving members $L^3$, the power is transmitted and the clutch members $M'$ are rotated, while the collars $M^3$ cannot turn. The sleeve $M^2$, actuated in this manner, serves to drive both wheel-axles $C^5$ through an equalizing-gearing which permits either wheel to turn relatively to the other wheel, allowing the vehicle to go around corners, but by which, nevertheless, the mean speed of the two wheels is always equal to the speed of the sleeve $M^2$. This equalizing-gearing consists of the following elements: The sleeve $M^2$ is enlarged centrally within the casing H to form an annular box, within which are carried what I will call "planetary" bevel-gears $M^5$. There may be one or more of these, preferably three, and they mesh with bevel-gears $M^6$, carrying on the approaching ends of the wheel shafts or axles. Now as these planet-gears $M^5$ are carried bodily around with the rotation of the sleeve $M^2$ it follows that if they do not rotate on their axes, but act as fixed parts, they turn both the shafts $C^5$ at equal speed, which is the same speed as that of the sleeve $M^2$, and this is the normal condition when the vehicle is running in a straight line. For this reason I provide no antifriction-bearings between the sleeve $M^2$ and the shafts $C^5$, for there is no motion between the two, except in going around curves. When, however, the vehicle is turned, as in going around curves, one wheel may be retarded and the other accelerated without any resistance in the mechanism, because the bevel-gear or planet-gear $M^5$ can turn freely to allow the relative movement or "twisting," so to speak, of the wheel shafts or axles $C^5$.

In order to prevent the tendency of the driving mechanism to turn the whole casing H, with all the connected parts, around the axle from bringing a side strain upon the shaft $F^3$, I may provide projecting lugs or rods $H^2$, which run loosely through openings in brackets $H^3$, secured beneath the wagon-body. These lugs or rods $H^2$ relieve the shaft $F^3$ and the universal telescopic joint from all side strains.

The second casing H and all its inclosed parts, as indicated in Fig. 2, may be identical with the details already explained, save that as the clutches thereof drive the common sleeve $M^2$ there is no second equalizing-gearing required. Of course the clutch members $L^3$ in one casing revolve in an opposite direction from those in the other casing, so that the wheels may be propelled forward or backward by the one or the other. In the movements shown in Figs. 9, 10, and 11 only one such casing H is employed and only one shaft $F^3$ and tubular shaft $G^2$; but the bevel-gear $L^5$ drives two single-clutch members $L^6$ $L^7$ in opposite directions, and the two respective coöperating clutch members $M^7$ are only one at a time frictionally engaged. These clutch members $M^7$ are feathered or splined, as before, to the sleeve M², and the sleeve M² actuates, as before described, the equalizing-gearing for the two wheel shafts or axles C⁵; but four levers P′ P² P³ P⁴, fulcrumed or pivoted to a common link P⁸, are employed and are actuated by sprocket-wheel K⁶ and shaft K⁵. The threading on this shaft K⁵, as will be seen from Fig. 11, forces the levers P′ and P³ together, while levers P² and P⁴ recede, and vice versa. The levers P² and P³ control the two clutch members M⁷, while the levers P′ and P⁴ are both connected to the sleeve M². When, therefore, the levers P′ and P³ are forced together, the clutch L⁷ is forced against its coöperating clutch M⁷ and the sleeve M² rotated in one direction, whereas when the levers P² and P⁴ are forced together, levers P′ and P³ being simultaneously drawn apart, as described, the clutch member L⁶ is brought into frictional engagement with the opposing clutch member M⁷, the sleeve M² correspondingly propelling the vehicle in the opposite direction. By this means I have combined in a single mechanism equalizing-gearing, frictional actuating connections, and a stopping and reversing mechanism.

For the better support and stiffening of the wheel-axles where they are interrupted at the equalizing mechanism I prefer to make them in the form of hollow shafts or tubes C⁵, as shown in the figures, and to place within them the stiff solid shaft or bar C⁹, which may with advantage run from end to end of both axles. As there is no relative motion between the bar C⁹ and the wheel-axles C⁵, save when the two wheels are turning at different speeds, and as the motion even then is but slight and of short duration, I provide no antifriction-bearings between these two parts and no means for applying oil, since the oil of the gearing will always work into the tubular wheel-axles.

For supporting the wheel-axles and securing them to the springs C′, I prefer to use the means shown in Figs. 12 and 12ᴬ, in which the box R′, provided with a ball-race for the ball-bearings R², is bolted directly to the spring C′, while the wheel-shaft C⁵ carries the coöperating ball-race.

For steering motor-carriages or automobiles, especially those that are adapted to run ten to twelve miles an hour in going long distances over good roads, it is desirable that a very easily manipulated steering-gear should be provided, yet one that will hold the front axle fixed in position until power is applied to change its position. It is also advisable that the turning of the front axle should under no conditions take place suddenly while the vehicle is running at full speed. To accomplish all these results, I provide an extremely simple mechanism, which consists in a curved angle-iron or rack S′, having worm-wheel teeth upon it and secured concentrically to the fifth-wheel, so as to turn with the front axle. Into this meshes a worm S², supported on a transverse shaft under the front of the vehicle. The worm-shaft is geared to a vertical shaft S³ by means of bevel-gearing, and an end wheel or crank S⁴ serves to turn the shaft S³ and thereby steer the vehicle. By means of this worm and wheel very great power can be applied when required in turning the front axle, while at the same time the violent shocks and twists which the front axle may encounter in running over stones cannot be transmitted back through the worm nor displace nor in any way interfere with the steering mechanism.

I have now described the mechanism of my invention in its most preferred form, leaving to the claims the defining of the general characteristics and features which distinguish my invention from other devices.

It will be seen that by the described mechanism not only can the power be easily and quickly applied in either direction, but that the motor, if it be of the self-governing type, can run idly when the vehicle is standing still without appreciable loss of power. When the vehicle is started, the power is applied gently and gradually through the yielding frictional clutches. Furthermore, if the clutch is not applied with too great force, the vehicle in striking any obstacle or running into any obstruction will allow the clutches to slip, preventing injury of the mechanism and perhaps saving the destruction of the vehicle and its occupants.

I claim, and desire to secure by these Letters Patent of the United States, the following several features and combinations:

1. In combination with the driving-wheel axles, or axle of a motor-vehicle, a clutch member turning concentrically but loosely about the axle, a second clutch member turning with the axle, means for engaging and disengaging the two clutch members, a mechanically-actuated shaft perpendicular to the wheel-axle, and bevel-gears connecting such shaft with the first said clutch member, substantially as set forth.

2. In combination in a motor-vehicle and with the driving-wheel axles or axle thereof, a frictional clutch concentric with the axle for actuating it, a pair of levers for engaging and disengaging the clutch, and a screw-threaded rod and nuts or bushings thereon connected to operate the said levers, substantially as set forth.

3. In combination in a motor-vehicle and with the driving-wheel axles or axle thereof, two frictional disk clutches or sets of clutches mounted concentrically with the axle, the driven members of which turn with the axle, two separate actuating connections from the motor, driving the driving members of the two clutches or sets in reverse directions, and means for engaging therewith the driven member or members of either clutch or set to propel the vehicle in either direction at will, substantially as set forth.

4. In combination in a motor-vehicle and with the driving-wheel axles or axle thereof, two frictional clutches mounted concentrically with the axle, the driven members of which are connected to drive the wheels and are relatively movable to and from the driving members along said axle, actuating connections from the motor to the driving members of the clutches turning them in opposite directions, and means for engaging either driving member at will to the coöperating driven member, by forcing them together in an axial direction, substantially as set forth.

5. In combination in a motor-vehicle and with a shaftless fly-wheel thereof, a gear carried thereby, and a second gear meshing therewith and connected to actuate the wheels, substantially as set forth.

6. In combination in a motor-vehicle, the continuously-running motor thereof, and driving connections, combining a telescopic and flexible joint, one or more frictional clutches, reversing mechanism, and equalizing means for driving both wheels jointly but independently, substantially as set forth.

7. In combination with the fly-wheel of the motor, mounted with the vehicle-body, driving-wheels movably secured by springs to the vehicle-body, an equalizing device for driving both wheels jointly but independently, and yielding driving connections between the fly-wheel and the equalizing device, substantially as set forth.

8. In combination with the fly-wheel of the motor, mounted with the vehicle-body, driving-wheels movably secured by springs to the vehicle-body, and connections between the fly-wheel and the two driving-wheels for jointly but independently actuating them in either direction at will without reversing the motion of the fly-wheel, substantially as set forth.

Signed this 25th day of October, 1898.

J. W. OGDEN.

Witnesses:
WM. H. SEBRING,
M. J. CASHIN.